(12) United States Patent
Sideris et al.

(10) Patent No.: US 9,953,444 B2
(45) Date of Patent: Apr. 24, 2018

(54) TILE BASED GRAPHICS PROCESSOR AND A METHOD OF PERFORMING GRAPHICS PROCESSING IN A TILE BASED GRAPHICS PROCESSOR

(71) Applicant: ARM LIMITED, Cambridge (GB)

(72) Inventors: Isidoros Sideris, Cambridge (GB); Michel Patrick Gabriel Emil Iwaniec, Cambridge (GB); Andrew Burdass, Cambridge (GB); Nebojsa Makljenovic, Cambridge (GB); Andreas Due Engh-Halstvedt, Trondheim (NO)

(73) Assignee: ARM Limited, Cambridge (GB)

( * ) Notice: Subject to any disclaimer, the term of this patent is extended or adjusted under 35 U.S.C. 154(b) by 246 days.

(21) Appl. No.: 14/874,829

(22) Filed: Oct. 5, 2015

(65) Prior Publication Data
US 2016/0110837 A1 Apr. 21, 2016

(30) Foreign Application Priority Data

Oct. 20, 2014 (GR) .............................. 20140100528

(51) Int. Cl.
*G06T 11/40* (2006.01)
*G06T 15/00* (2011.01)
(Continued)

(52) U.S. Cl.
CPC ................ *G06T 11/40* (2013.01); *G06T 1/20* (2013.01); *G06T 1/60* (2013.01); *G06T 15/00* (2013.01);
(Continued)

(58) Field of Classification Search
CPC ... G06T 11/40; G06T 1/20; G06T 1/60; G06T 15/00; G06T 15/005; G06T 15/40; G06T 15/405
(Continued)

(56) References Cited

U.S. PATENT DOCUMENTS 6,008,820 A * 12/1999 Chauvin ................. G06T 11/40
345/502
8,704,826 B1 * 4/2014 Hakura ................. G06T 15/005
345/419
(Continued)

FOREIGN PATENT DOCUMENTS

| EP | 1 089 235 | 4/2001 |
|----|-----------|--------|
| EP | 1 434 172 | 6/2004 |
| WO | WO 2012/010968 | 1/2012 |

OTHER PUBLICATIONS

Search Report for GB1500127.4 dated Jun. 25, 2015, four pages.

*Primary Examiner* — King Poon
*Assistant Examiner* — Vincent Peren
(74) *Attorney, Agent, or Firm* — Nixon & Vanderhye P.C.

(57) ABSTRACT

A graphics processing apparatus and method of performing graphics processing are provided. The graphics processing apparatus comprises a sequence of processing stages capable of performing graphics processing to generate a frame of display data. The graphics processing is performed on a tile-by-tile basis. The graphics processing apparatus is capable of determining if a current tile subject to the graphics processing is empty. At least one processing stage of the sequence of processing stages is omitted for graphics processing of the current tile in dependence on whether the current tile is empty.

18 Claims, 8 Drawing Sheets

(51) Int. Cl.
    *G06T 15/40*          (2011.01)
    *G06T 1/20*           (2006.01)
    *G06T 1/60*           (2006.01)

(52) U.S. Cl.
    CPC ............ *G06T 15/005* (2013.01); *G06T 15/40* (2013.01); *G06T 15/405* (2013.01); *G06T 2207/20021* (2013.01)

(58) Field of Classification Search
    USPC ........ 345/501, 502, 503, 504, 505, 506, 522
    See application file for complete search history.

(56) References Cited

U.S. PATENT DOCUMENTS

| | | | |
|---|---|---|---|
| 2009/0295800 A1 | 12/2009 | Vetter et al. | |
| 2011/0292032 A1* | 12/2011 | Yang | G06T 15/005 345/419 |
| 2014/0118393 A1* | 5/2014 | Hakura | G06T 15/005 345/628 |
| 2015/0278981 A1* | 10/2015 | Akenine-Moller | G06T 1/20 345/522 |

* cited by examiner ized as the frame of graphics data. This is a technique
TILE BASED GRAPHICS PROCESSOR AND A METHOD OF PERFORMING GRAPHICS PROCESSING IN A TILE BASED GRAPHICS PROCESSOR This application claims priority to GR Patent Application No. 20140100528 filed 20 Oct. 2014, the entire content of which is hereby incorporated by reference.

TECHNICAL FIELD

The present disclosure relates to data a processing. More particularly the present disclosure relates to graphics processing.

BACKGROUND

A graphics processing apparatus (often referred to as a GPU—graphics processing unit) may be arranged to perform tile based processing. That is to say, for each frame of graphics data which it generates for display it sub-divides the frame into multiple tiles and performs its graphics processing on each tile. The processed tiles are then accumulated as the frame of graphics data. This is a technique which may for example be used in the context of a data processing system which is intended for implementation in a portable device, because the pressure for such a device to be particularly efficient may be greater. Such tile based processing may require a sequence of smaller memory accesses to be made rather than fewer larger memory accesses, which can be preferable in the context of a portable device. Nevertheless, the pressure for the components of a data processing apparatus to become more efficient in their operations, which may be particularly acute in the context of a data processing apparatus implemented in a portable device, is ever present. The present disclosure provides techniques which can make a tile based graphics processing apparatus more efficient.

SUMMARY

At least some embodiments provide a graphics processing apparatus comprising: a sequence of processing stages to perform graphics processing to generate a flame of display data, wherein the sequence of processing stages is capable of performing the graphics processing on a tile-by-tile basis, and wherein the graphics processing apparatus is capable of determining if a current tile subject to the graphics processing is empty, and wherein the graphics processing apparatus is capable of causing at least one processing stage of the sequence of processing stages to be omitted for graphics processing of the current tile in dependence on whether the current tile is empty.

At least some embodiments provide a method of graphics processing comprising: performing graphics processing in a sequence of processing stages to generate a frame of display data, wherein the sequence of processing stages is capable of performing the graphics processing on a tile-by-tile basis; determining if a current tile subject to the graphics processing is empty; and causing at least one processing stage of the sequence of processing stages to be omitted for graphics processing of the current tile in dependence on whether the current tile is empty.

At least some embodiments provide a graphics processing apparatus comprising: means for performing graphics processing in a sequence of processing stages to generate a frame of display data, wherein the sequence of processing stages is capable of performing the graphics processing on a tile-by-tile basis; means for determining if a current tile subject to the graphics processing is empty; and means for causing at least one processing stage of the sequence of processing stages to be omitted for graphics processing of the current tile in dependence on whether the current the is empty.

BRIEF DESCRIPTION OF THE DRAWINGS

The present invention will be described further, by way of example only, with reference to embodiments thereof as illustrated in the accompanying drawings, in which.

DESCRIPTION OF EMBODIMENTS

Figure 1:
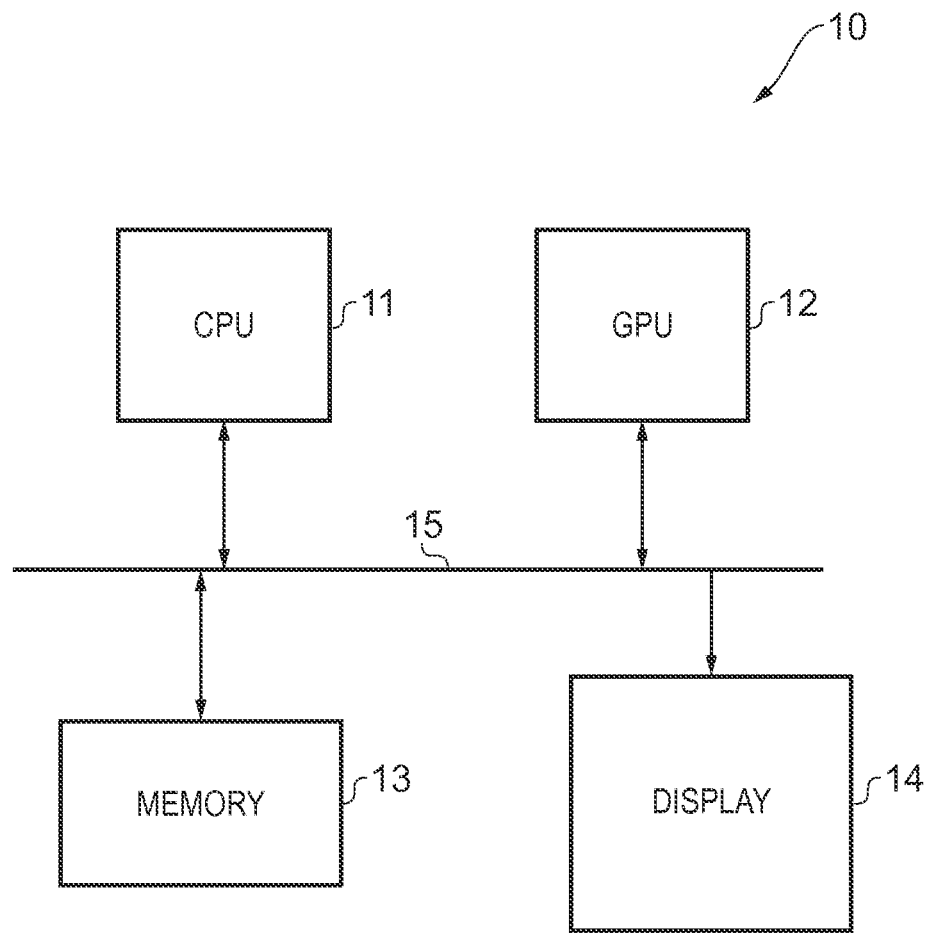
FIG. 1 schematically illustrates a data processing system comprising a graphics processing apparatus in one embodiment.

At least some embodiments provide a graphics processing apparatus comprising: a sequence of processing stages to perform graphics processing to generate a frame of display data, wherein the sequence of processing stages is capable of performing the graphics processing on a tile-by-tile basis, and wherein the graphics processing apparatus is capable of determining if a current tile subject to the graphics processing is empty, and wherein the graphics processing apparatus is capable of causing at least one processing stage of the sequence of processing stages to be omitted for graphics processing of the current tile in dependence on whether the current tile is empty.

The present techniques recognise that when a draw command is received by the graphics processing apparatus (e.g. issued by a central processing unit (CPU)) the geometrical object specified by that draw command may only partially cover the area of the frame of display data. Accordingly, there may exist a number of tiles which the graphics processing apparatus handles as it processes (e.g. iteratively sweeps through) the frame, which do not contain any content related to the geometrical object specified by the draw command. Moreover, as a result of this, the graphics processing apparatus may ultimately, at the end of the (e.g. pipelined) graphics processing which it performs, produce a final, processed tile which will not contribute (in a visible way) to the frame of display data. The present techniques provide mechanisms by which such tiles can be identified, and subsequently labelled as "empty", and for which the graphics processing apparatus can cause at least one processing stage of the sequence of processing stages which it performs for each tile to be omitted, in dependence on whether that tile has been identified as empty or not. As a result, processing operations by at least one stage of the graphics processing apparatus need not be carried out and the graphics processing apparatus is thus made more efficient. For example the power associated with running that processing stage for that empty tile may be saved, and moreover the processing stage may be freed up to be able to begin processing of the next tile, bringing processing speed improvements.

In some embodiments the frame of display data comprises a display parameter for each tile in the frame, and the graphics processing apparatus is capable of setting a predetermined value of the display parameter for the current tile if it will not contribute to the display of the frame of display data, and wherein the graphics processing apparatus is capable of causing the at least one processing stage of the sequence of processing stages to be omitted for graphics processing of the current tile if the current tile is empty and the display parameter of a corresponding tile of a previous frame at a same display position as the current tile has the predetermined value.

In such embodiments the graphics processing apparatus can make use of the display parameter having the predetermined value to indicate that this tile will not contribute to the display of the frame of display data. For example, where the display parameter is a depth value or a colour value the pre-determined value of the display parameter can indicate "depth clear" or "colour clear" respectively. A tile having one of these predetermined values set may be referred to as having been "cleared". In particular, the present techniques recognise that if the same display parameter of a corresponding tile of a previous frame at the same display position also has the predetermined value then the graphics processing of this previous tile will typically have already marked the tile as not contributing to the frame of display data (e.g. for the depth/colour value example above by "clearing" this tile in a frame buffer being accumulated for the purposes of display of the frame of display data by setting the value as "depth clear" or "colour clear" respectively) and accordingly by recognising that ultimately the apparatus will also seek to set the same pre-determined value of the display parameter for the current tile, then graphics processing for the current tile can be saved and hence at least one processing stage of the sequence of processing stages can then be omitted, for example saving processing time and power expenditure.

The present techniques also recognise that if the current tile is empty and the display parameter of a corresponding tile of the previous frame at the same display position does not have the predetermined value, then it may not necessarily be the case that the tile for this display position (e.g. in a frame buffer being accumulated for the purposes of display of the frame of display data) will already have been marked as not contributing to the display of the frame of display data (e.g. for the depth/colour value example by having already been "cleared" by having been marked as "depth clear" or "colour clear" respectively). Accordingly, in some embodiments the graphics processing apparatus is capable of causing the at least one processing stage of the sequence of processing stages to be carried out for graphics processing of the current tile if the current tile is empty and the display parameter of a corresponding tile of the previous frame at the same display position as the current tile does not have the predetermined value. In other words, when the graphics processing apparatus is arranged to selectively cause one or more processing stages to be omitted, it can nevertheless cause those one or more processing stages to be carried out if the current tile is empty but this may be the first tile to give the display parameter the predetermined value.

In some embodiments the display parameter comprises at least one of a colour value and a depth value. In such embodiments the predetermined value may then indicate colour clear or depth clear respectively.

The graphics processing apparatus may be arranged to keep track of which tiles of the multiple tiles will and will not contribute to the display of the frame of display data in a variety of ways, but in some embodiments the graphics processing apparatus is capable of maintaining a clearance indication for each tile of the multiple tiles and to cause the clearance indication to be set for tiles determined to have the predetermined value of the display parameter. For example the clearance indication may be a data item, e.g. a single bit, which indicates whether that tile has the predetermined value of the display parameter (e.g. has been set with colour clear or depth clear).

Such a clearance indication may be stored in a variety of ways, but in some embodiments the graphics processing apparatus further comprises a clearance buffer capable of storing the clearance indication as a clearance bitmap. A bitmap, e.g. holding a single bit which can be set or unset for each tile, represents a compact and easily referenced implementation of the storage of these clearance indications.

Whilst the clearance indication could be stored in a variety of ways, for example in a dedicated storage component of the graphics processing apparatus, in some embodiments the graphics processing apparatus comprises a data buffer capable of storing information related to the frame of display data, wherein the graphics processing apparatus is capable of storing the clearance indication as additional content of the data buffer. Where the clearance indication may represent a relatively small amount of data, e.g. a single bit per tile, the present techniques recognise that rather than providing a dedicated storage component for these clearance indications, an existing data buffer provided in the graphics processing apparatus for storing information related to the frame of display data can be re-used by adding a small amount of storage capacity, or using a small amount of existing storage capacity, to store the clearance indication as additional content of that data buffer. In this manner the clearance indications can be stored with little further imposition on the graphics processing apparatus.

In some embodiments the graphics processing apparatus is capable of accessing a frame buffer which is updated to hold the frame of display data by a frame buffer updating stage of the sequence of processing stages, and the frame buffer updating stage is capable of updating the frame buffer for the current tile in dependence on a comparison between a checksum value for the current tile and a stored checksum value for the corresponding tile of the previous frame at the same display position, and the graphics processing apparatus is capable of determining if the current tile has the predetermined value in dependence on the checksum value for the current tile. Where the graphics processing apparatus is arranged to decide whether to update the frame buffer based on a check sum value (e.g. a cyclical redundancy check (CRC) value) calculated for the current tile and a stored check sum value for the corresponding tile of the previous frame at the same display location, this enables the graphics processing apparatus to eliminate certain transactions, in particular, an update of the frame buffer which is not required may be eliminated, in the event that the two check sum values match indicating that the data which would be updated in the frame buffer for this current tile is in fact identical to that which has already been stored there for the corresponding tile of the previous frame at the same display location. In such embodiments, the graphics processing apparatus can make further use of this check sum value calculated for the current tile to determine the predetermined value of the display parameter for the current tile. For example, the frame buffer updating stage can be arranged to compare the check sum value for the current tile against a check sum value for a tile known to have a predetermined value of the display parameter and by this mechanism determine if the current tile has the predetermined value.

The graphics processing apparatus may be capable of causing various different stages of the sequence of processing stages to be omitted for graphics processing, and in some embodiments the graphics processing apparatus is capable of accessing a frame buffer which is updated to hold the frame of display data by a frame buffer updating stage of the sequence of processing stages, and the graphics processing apparatus is capable of causing the frame buffer updating stage of the sequence of processing stages to be omitted for graphics processing of the current tile in dependence on whether the current tile is empty. The frame buffer may for example be stored in an external memory.

Alternatively, or in addition, in some embodiments the graphics processing apparatus comprises a tile buffer in which display data for the current tile is stored by a tile buffer updating stage of the sequence of processing stages, and the graphics processing apparatus is capable of causing the tile buffer updating stage of the sequence of processing stages to be omitted for graphics processing of the current tile in dependence on whether the current tile is empty. The tile buffer may for example be arranged to temporarily store display data for a relatively small subset of the frame of display data and may be provided within the graphics processing apparatus, but could also be provided elsewhere, such as in an external memory.

In some embodiments the sequence of processing stages comprises a tiling stage capable of subdividing the frame into the multiple tiles and to issue the current tile to a subsequent processing stage, and the graphics processing apparatus is capable of causing the tiling stage not to issue the current tile to the subsequent processing stage in dependence on whether the current tile is empty. Given that the graphics processing apparatus is capable of sub-dividing the frame into multiple tiles and to perform the graphics processing on a tile-by-tile basis (i.e. it is a tile based GPU), the tiling stage which is capable of sub-dividing the frame into multiple tiles will typically be a relatively early stage in the sequence processing stages, and it is therefore beneficial for the tiling stage not to issue the current tile to the subsequent processing stage (in order to implement the omission of at least one processing stage of the sequence of processing stages) since this will then typically allow the majority of the processing stages to be omitted and hence a beneficial amount of processing time and energy expenditure may for example be saved.

In some embodiments the graphics processing performed by the sequence of processing stages comprises generating a primitive list for the current tile, wherein the primitive list is indicative of graphical components of the geometrical object, and the graphics processing apparatus is capable of determining if the current tile is empty from the primitive list. These graphical components of the geometrical object may for example comprise one or more polygons by means of which the graphics processing apparatus will determine how to display the geometrical object in the frame of display data, and by comparing the locations of these polygons within the frame with its knowledge of the location of tiles within the frame, the graphics processing apparatus can determine whether these graphical components which will be used to represent the geometrical object have any part which is within the current tile, and on this basis it can be determined if the current tile is empty or not from the primitive list.

In some embodiments the graphics processing apparatus is capable of maintaining an emptiness indication for each tile of the multiple tiles and to cause the emptiness indication to be set for a tile determined to be empty. This emptiness indication for each of the tiles could be maintained in a variety of ways, for example, either locally within the graphics processing apparatus itself, in a local cache, and/or in an external memory, but however arranged the present techniques recognise that the graphics processing apparatus can thus be provided with a useful reference to determine if any particular tile (most notably in the present context a particular tile from a previous frame at the same display location as the current tile) has been determined to be empty.

In some embodiments the graphics processing apparatus further comprises an emptiness buffer capable of storing the emptiness indication as part of an emptiness bitmap. Storing the emptiness indication as part of an emptiness bitmap, e.g where the emptiness indication comprises a single bit for each tile, represents a compact and therefore storage efficient manner in which to store this information. When stored in this compact manner this makes the local storage of the emptiness indication more attractive, for example in a small amount of dedicated storage within the graphics processing apparatus, thus facilitating rapid access for the graphics processing apparatus to this information.

In embodiments in which the graphics processing apparatus is capable of maintaining the clearance indication for each tile of the multiple tiles, and is also capable of maintaining the emptiness indication for each tile of the multiple tiles, then this provides the graphics processing apparatus with two accessible indications, which when combined can show, for a particular tile of the multiple tiles, whether further graphics processing of the current tile is required or can be omitted. Accordingly, in some embodiments the graphics processing apparatus is capable of causing the at least one processing stage of the sequence of processing stages to be omitted for graphics processing of the current tile if the current tile is empty and the clearance indication has been set for the corresponding tile of the previous frame at the same display position as the current tile.

In embodiments in which the frame of display data comprises a display parameter for each tile in the frame, the graphics processing apparatus may be arranged to be responsive to a display parameter write configuration which indicates whether the display parameter should be written by the graphics processor apparatus for a current tile. For example, where the display parameter is a colour value or a depth value, the display parameter write configuration could then be a "colour write" and/or "depth write" configuration which is enabled or disabled. This display parameter write configuration may be set for an individual draw command (call), may be set for each frame, and so on. However configured, when this display parameter write configuration is used, the graphics processing apparatus may reference that configuration, as well as information indicating if the current tile is empty and the stored emptiness indication has been set for the corresponding tile of the previous frame at the same display position, to determine whether further processing of the current tile is required. This is due to the fact that the present techniques recognise that if the display parameter write configuration is enabled, and both the current tile and the previous tile are empty, it can be deduced that the tile will already have been marked as not contributing to the display of the frame of display data and thus needs no further processing. For example, this could comprise the above-mentioned "colour write" configuration being enabled, and two consecutive tile empty bitmaps indicating "empty" for this tile in the current frame and in the previous frame. A similar determination could also be made on the basis of the above-mentioned "depth write". Accordingly, in some embodiments the frame of display data comprises a display parameter for each tile in the frame, and the graphics processing apparatus is capable of setting a predetermined value of the display parameter for a tile which will not contribute to the display of the frame of display data if a display parameter write configuration has been enabled for that tile, and wherein the graphics processing apparatus is capable of causing the at least one processing stage of the sequence of processing stages to be omitted for graphics processing of the current tile if the current tile is empty and the emptiness indication has been set for the corresponding tile of the previous frame at the same display position as the current tile and the display parameter write configuration is enabled.

In some embodiments the graphics processing apparatus further comprises storage capable of storing an emptiness indication for the current tile. The provision of storage capable of storing an emptiness indication for the current the enables the graphics processing apparatus to reference and make use of this information in a variety of ways.

For example in some embodiments the storage capable of storing the emptiness indication for the current tile is capable of storing a current emptiness bitmap for at least a portion of a current frame to which the current tile belongs. Hence where the emptiness indication is stored in a current emptiness bitmap for at least a portion of the current frame, this supports flexibility in the configuration of how the graphics processing apparatus operates, for example enabling the emptiness indication to be determined and stored for a number of tiles (e.g. for all tiles in a frame) before other processing is initiated. It may also improve the memory access efficiency of the graphics processing apparatus when this storage is accessed, for example in that multiple emptiness indications can be transferred as a block, thus amortizing the cost of initiating a memory transfer. It also supports an arrangement in which multiple emptiness indications can be determined by the graphics processing apparatus before other processing is carried out.

In some embodiments the graphics processing apparatus is configured to preload emptiness indications for multiple tiles from the storage capable of storing the emptiness indication for the current tile. Thus where these emptiness indications for multiple tiles have already been determined and stored, the graphics processing apparatus may make an efficient preload in which emptiness indications for multiple tiles are transferred at once.

At least some embodiments provide a method of graphics processing comprising: performing graphics processing in a sequence of processing stages to generate a frame of display data, wherein the sequence of processing stages is capable of performing the graphics processing on a tile-by-tile basis; determining if a current tile subject to the graphics processing is empty; and causing at least one processing stage of the sequence of processing stages to be omitted for graphics processing of the current tile in dependence on whether the current tile is empty.

At least some embodiments provide a graphics processing apparatus comprising: means for performing graphics processing in a sequence of processing stages to generate a frame of display data, wherein the sequence of processing stages is capable of performing the graphics processing on a tile-by-tile basis; means for determining if a current tile subject to the graphics processing is empty; and means for causing at least one processing stage of the sequence of processing stages to be omitted for graphics processing of the current tile in dependence on whether the current tile is empty.

Some particular embodiments are now described with reference to the accompanying figures.

FIG. 1 schematically illustrates a data processing apparatus 10 which comprises a central processing unit (CPU) 11, a graphics processing unit (CPU) 12, a memory 13 and a display 14. These components are coupled together via a system bus 15. The present techniques are in particular concerned with the arrangement of the CPU 12, example embodiments of which are described with reference to the following figures. Whilst the CPU 11 is a general purpose processing unit, the CPU 12 is a dedicated device provided in association with the CPU 11 in order to perform delegated tasks on its behalf, in a particular graphics processing. Hence, when the CPU 11 has graphics processing tasks to perform (amongst the various data processing operations which it performs and administers), these graphics processing tasks are delegated to the CPU 12. This delegation of graphics processing tasks from the CPU 11 to the CPU 12 is performed by means of a draw call which the CPU 11 issues to the CPU 12 in order to instruct it to perform graphics processing tasks. The CPU 12 then performs the graphics processing with reference to specified data in the memory 13, preparing frames of display data in a frame buffer in memory, from where the frames of display data are transferred via the system bus 15 for display on the display 14. It should further be noted that the GPU 12 is a tile based GPU, in that it is configured to subdivide the frame into a number of tiles (e.g. each tile being for example 16×16 or 32×32 pixels) and to perform various aspects of the graphics processing iteratively with respect to individual tiles, rather than with respect to the entire frame (in the manner that an immediate mode renderer would). Further detail of this tile based graphics processing carried out by the GPU 12 will be apparent from the description of the figures which follow.

Figure 2A:
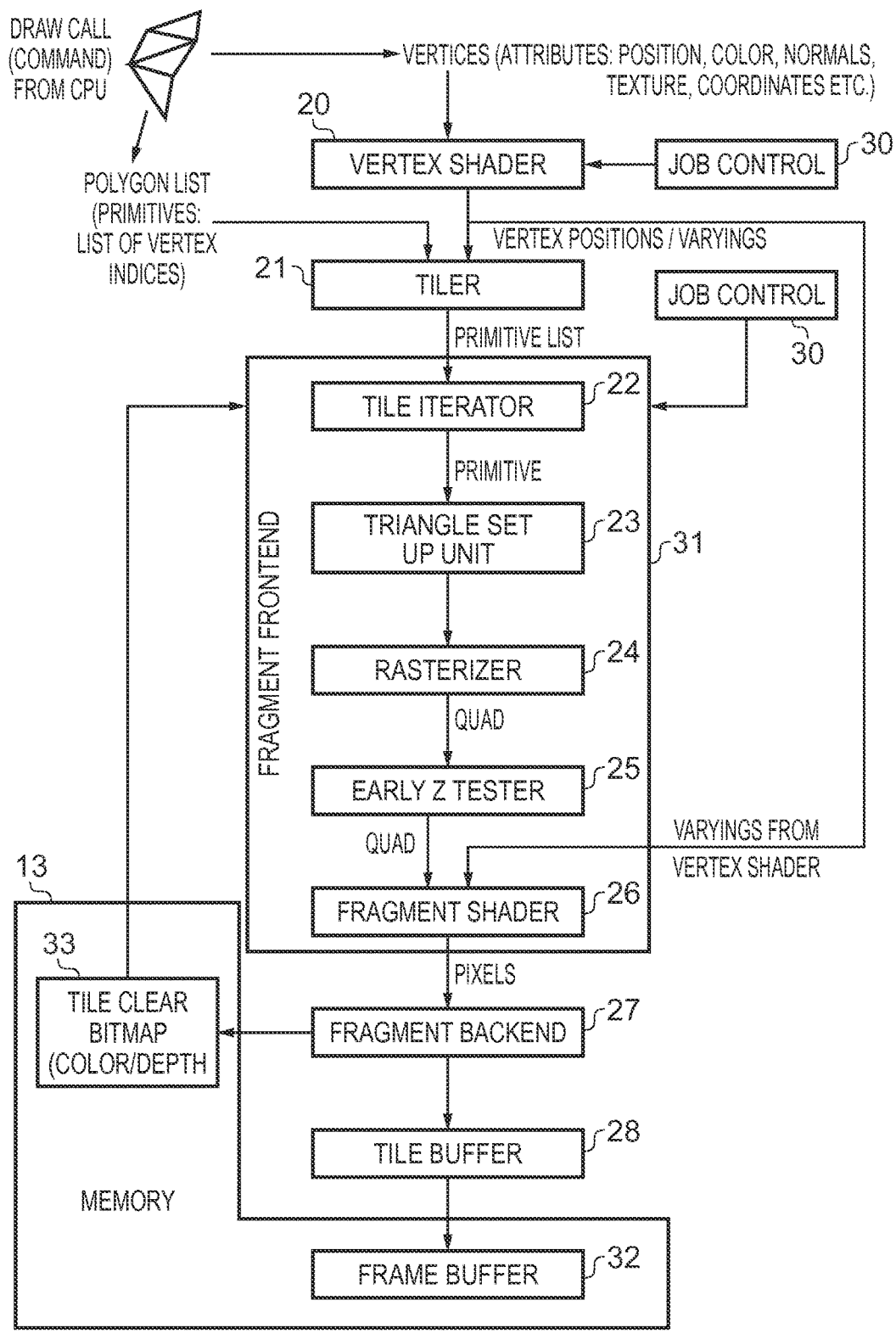
FIG. 2A schematically illustrates a graphics processing apparatus and a memory in one embodiment.

FIG. 2A schematically illustrates in more detail the configuration of the GPU 12 in one example embodiment. Note that the memory 13 is also represented in FIG. 2A and does not form part of the graphics processing unit. The graphics processing apparatus in the embodiment shown in FIG. 2A comprises a sequence of pipelined stages 20-28 which perform the graphics processing operations. Job control 30 is also provided, which maintains control in particular over the sets of processing tasks which are issued from selected processing stages to the next, e.g. which tiles are issued to the fragment frontend for processing should be noted that the illustrated components 20-28 and 30 of the GPU 12 may form physically distinct components, for example embodied as dedicated circuitry, but some components may also be provided, at least in part, by general purpose processing circuitry executing dedicated firmware or software to provide the required functionality described herein.

Having received a draw call from the CPU defining a geometrical object which should be represented in the frame of display data which the graphics processing apparatus is configured to generate, the GPU first determines from the draw call the vertices defined by the draw call (these having various attributes such as position, colour, normals, texture coordinates and so on). The GPU also determines a polygon list on the basis of the draw call received, this polygon list providing a set of primitives, which define a list of the vertex indices.

The first processing stage of the GPU explicitly shown in FIG. 2A is the vertex shader 20, which operates under the control of the job control 30 to receive the vertices defined by the draw call and generate vertices with transformed positions and varyings. The vertex positions and the polygon list defined by the draw call are received by the next processing stage, namely the tiler 21. The tiler 21 then iterates through the predetermined subdivision of the frame into multiple tiles, in particular determining for each defined tile a primitive list of relevance to that tile (i.e. from the polygon list and vertex positions which it receives, it determines a primitive list per tile in the frame). Once this primitive list per tile has been determined, individual tiles are issued to the fragment frontend 31, under control of the job control unit 30, to be processed in the sequence of pipelined stages which follow. The fragment frontend 31 comprises the tile iterator 22, the triangle setup unit 23, the rasterizer 24, the early z tester 25 and the fragment shader 26. Each tile is iteratively processed (selected by tile iterator 22) and within that tile a primitive is passed from the tile iterator 22 to the triangle setup unit 23 in order to determine the relevant triangle coefficients for rasterization. The rasterization (the generation of the pixels/quads covering the triangle) are generated by the rasterizer 24. Rasterized quads (a quad being a block of 2×2 pixels) are passed to the early z tester 25 (for a determination to be made about whether this quad can already be known to be hidden in the final display due to the its depth (z) value) and quads which pass this test are then forwarded to the fragment shader 26. The fragment shader 26 also receives the varyings (from the vertex shading carried out by the vertex shader 20) and the fragment shader 26 then performs the fragment shading required (e.g. varying interpolation etc.).

The pixels thus generated by the fragment frontend 31 are then passed to the fragment backend 27 which performs the final processing stages such as z late z testing, blending and so on. The fragment backend 27 then writes the processed pixel information into the tile buffer 28, from where the processed tiles are then transferred to the frame buffer 32 in memory 13.

For tiles which it processes which are found to be empty, the fragment backend 27, is configured to set as "clear" certain information in the frame buffer 32 representing this tile. In particular, in this embodiment where the tile buffer 28 (and hence also the frame buffer 32) comprise both a colour buffer and depth buffer for the tile information held therein, an attribute (e.g. parameter) of a colour and/or depth value for this empty tile is set to indicate this "clear" status. In addition however the fragment backend 27 is configured to maintain a tile clear bitmap 33 which is stored in memory 13, in which a single bit is set for each tile of the frame indicating for each tile in the frame if that tile has been cleared. The content of the tile clear bitmap 33 is also accessible to the fragment frontend 31, such that the fragment frontend 31 receives both the primitive list for the current tile being processed as well as the information from the tile clear bitmap 33 indicating if the tile has previously been cleared. This previous clearance could either have occurred with respect to the previous frame or in a frame before that and never varied from that clear status. Based on this information, the fragment frontend 31 determines what kind of processing is required for the current tile. If, from the tile primitive list, it is determined that the tile is not empty then normal graphics processing is carried out through the sequence of pipelined processing stages. However, if the current tile is recognised from the content of the tile primitive list as being empty, but the corresponding entry in the tile clear bitmap 33 indicates that this tile is not set as having been cleared (i.e. this tile was not set as, or maintained as, clear in the previous frame) then this tile is also processed normally by the sequence of pipelined processing stages. However, it should be noted that once this tile reaches the fragment backend 27, because this current tile is empty, the relevant colour and/or depth buffer will be cleared in the tile buffer 28 (and consequently in the frame buffer 32). This processed tile is then stored normally into the tile buffer 28 and from there transferred to the frame buffer 32. The clearance of the colour and/or depth buffer by the fragment backend 27 also causes the corresponding entry for this tile in the tile clear bitmap 33 to be updated to indicate that this tile has now been cleared.

As a result, for a tile which the tile iterator 22 within the fragment frontend 31 determines from the corresponding primitive list is empty, if the indication stored in the tile clear bitmap 33 for this tile shows that the tile has been cleared in (at least) the previous frame, then the fragment frontend 31 can recognise that there is no need to perform the same tile clearance again for this tile. Moreover there is no need to write this tile to the frame buffer, since like the same tile in the previous frame it will not be contributing to the display of the this frame of display data. Note that as described here the tile clear bitmap 33 is maintained both for the colour and the depth buffer components with respect to each tile, but could equally well be performed for just one of these attributes of each tile.

Figure 2B:
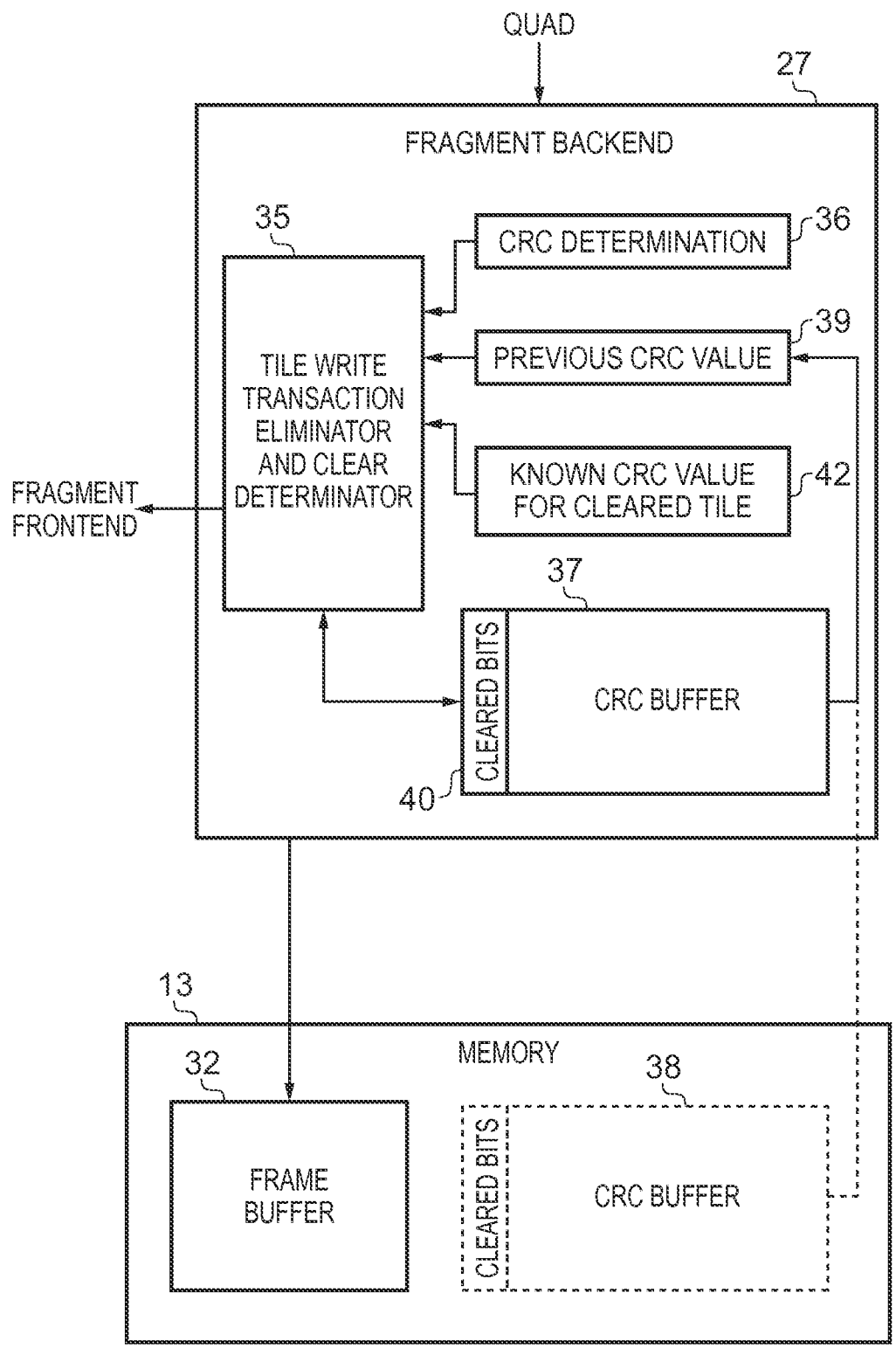
FIG. 2B schematically illustrates further detail of a fragment backend in a graphics processing apparatus in one embodiment and an associated memory.

FIG. 2B schematically illustrates one example embodiment of the fragment backend 27 shown in FIG. 2A. This particular example configuration of the fragment backend 27 shows how the determination of the clear status of the current tile and storage of the tile clear bitmap may be incorporated into other functionality and storage of the fragment backend 27. The embodiment of the fragment backend 27 shown in FIG. 2B is arranged to perform "transaction elimination" with respect to certain tiles which the graphics processing apparatus processes. In particular, the fragment backend 27 has a tile write transaction eliminator 35 which is arranged to determine if the writing of particular tile content into the frame buffer 32 in memory 13 can be avoided, i.e. if this memory transaction can be eliminated. This transaction elimination possibility is determined with respect to a cyclical redundancy check (CRC) value which is determined for each tile on the basis of the data values which make up the representation of that tile. The fragment backend 27 thus has a CRC determination unit 36 which calculates this CRC value for each tile. The tile write transaction eliminator 35 then stores the CRC value for the tile being processed in the CRC buffer 37, which is arranged to be capable of storing a corresponding CRC value for each tile in the frame. Note that (as indicated by the dashed line alternative in the figure) the CRC buffer 38 could also be provided in memory 13 instead of within the fragment backend 27. To determine if the writing of a current tile to the frame buffer 32 can be avoided, the tile write transaction eliminator 35 receives both the calculated CRC value for the current tile (from the CRC determination unit 36) and the previous CRC value (retrieved by the previous CRC value unit 39) from the CRC buffer 37. If the CRC values are identical then this indicates that the content of the tile has not changed, and there is no need to rewrite the same information for this tile into the frame buffer 32. The write transaction associated with this tile can then be eliminated (cancelled). More detail of this transaction elimination can be found in UK published patent applications GB2474114A and GB2474115A, the entire content of which are incorporated herein by reference.

As labelled in FIG. 2B, the tile write transaction eliminator 35 is also configured to perform a clear determination function for each tile on the basis of values stored in the CRC buffer 37 (which includes the "cleared bits" portion 40). Note therefore that the provision of this storage 37/40 providing clearance information associated with each tile of the frame thus substitutes for the tile clear bitmap 33, which is shown as a separate component in the embodiment of FIG. 2A. The tile write transaction eliminator and clear determinator 35 thus administers the provision of the tile clear indication to the fragment frontend 31 in this FIG. 2B embodiment. The fragment backend 27 is additionally configured to store a known CRC value for a cleared tile 42 (e.g. a descriptor default clear color value) to which the tile write transaction eliminator and clear determinator 35 can make reference. This enables the tile write transaction eliminator and clear determinator 35 to compare the CRC value determined for the current tile with a known CRC value which results for a cleared tile, and thus to efficiently recognise when the current tile is also clear. On this basis the corresponding clear indication can indicated to the fragment frontend. On the other hand, a small part (the "cleared bits" portion 40)—in this embodiment just one bit per tile—of the CRC buffer is used for storage of an indication (per tile) of whether each tile in the frame has previously been cleared or not. The tile write transaction eliminator and clear determinator 35 can thus determine with reference to this set of bits whether a given tile is clear or not (in dependence on whether it has previously been cleared). Hence the CRC buffer may be used in two was in this embodiment: firstly the value stored in the main part of the buffer (labelled 37 in FIG. 2B) for a given tile allows a determination (by comparison with a known value, e.g. the descriptor default clear color value) that the tile is clear; and secondly a small portion of the buffer (e.g. one bit per tile) (labelled 40 in FIG. 2B) can be referenced to determine if the tile has previously been cleared (without any comparison of color values).

Figure 3:
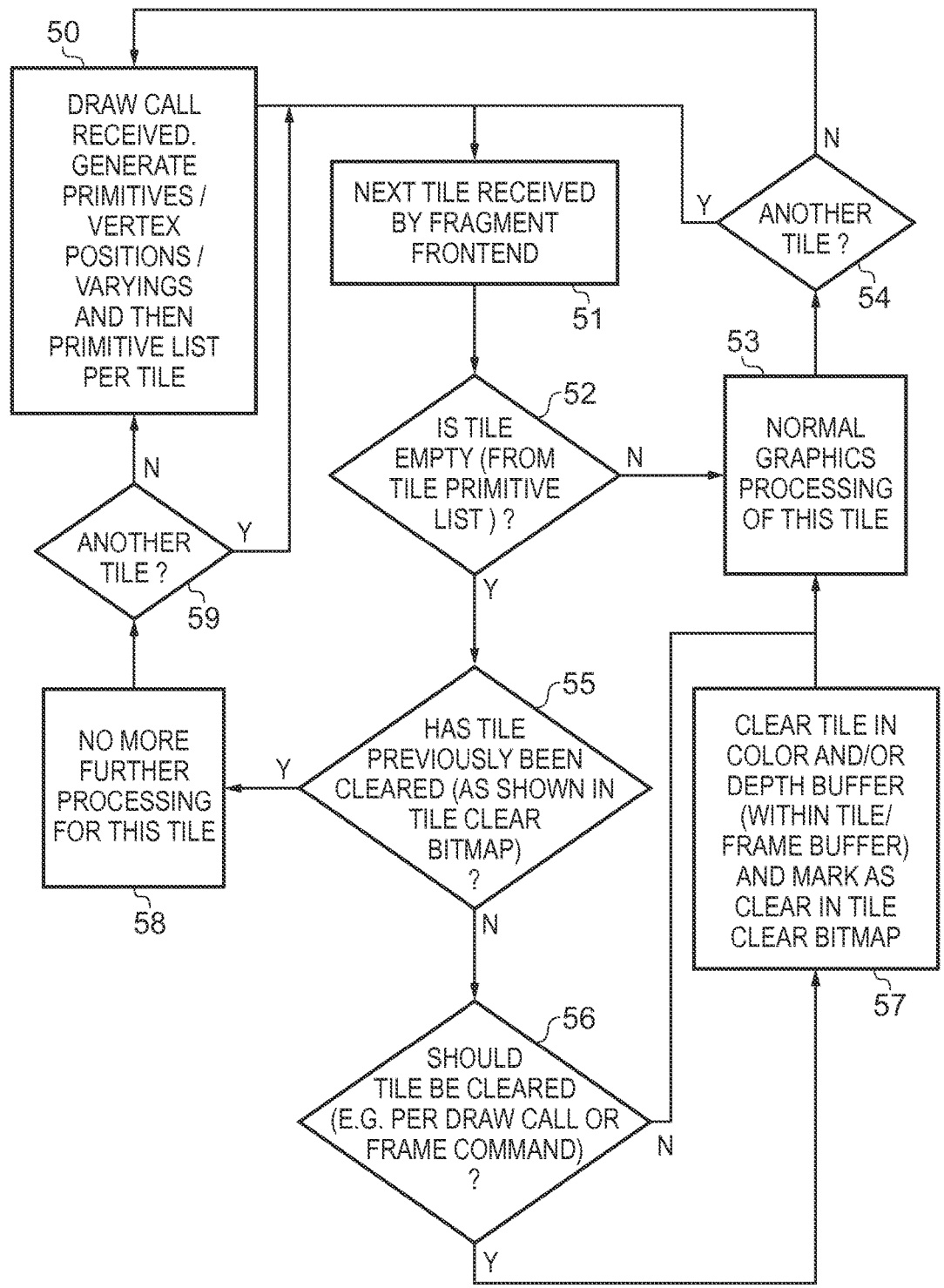
FIG. 3 shows a sequence of steps which may be performed by a graphics processing apparatus such as that illustrated in FIG. 2A in one embodiment.

FIG. 3 schematically illustrates a sequence of steps which are taken in the method of one embodiment. The processing flow can be considered to begin at step 50 where the CPU receives a draw call from the CPU and from this generates the primitives, vertex positions and varyings and then a primitive list per tile. Once the tiler has processed all tiles in the frame in this manner the flow proceeds to step 51 where under the administration of the job control function of the GPU the next tile to be processed is issued to and received by the fragment frontend. It is then determined at step 52 from the tile primitive list if this tile is empty. If it is not, then flow proceeds to step 53 where further normal graphics processing of this tile is carried out. Then at step 54 it is determined if there is another tile for this frame to be processed. If there is, the flow proceeds to step 51. If there isn't, the flow returns to step 50 for another draw call from the GPU to be handled.

If however t step 52 it is determined that this tile is indeed empty, then the flow proceed to step 55 where it is determined from the tile clear bitmap if the tile has previously been cleared (where this tile clear bitmap may be provided as a stand alone item of storage in the memory 13—such as in the case of the tile clear bitmap 33 shown in FIG. 2A—or may be incorporated into another set of data being stored for processed tiles—as in the case of the addition of this information to the CRC buffer 37 in the embodiment of FIG. 2B). If the tile clear bitmap indicates that this tile has not been previously cleared then the flow proceeds to step 56 where it is determined if the tile should be cleared for this current tile, this being determined by whether "colour write" and/or "depth write" are/is enabled for this tile. The colour/depth write enable configuration may be set by a global configuration applying to, say, each draw call or frame. If colour (and/or depth) write is not enabled, then the flow proceeds directly to step 53 where further normal graphics processing of this tile is carried out. If however colour (and/or depth) write is enabled for this tile, then the flow proceeds via step 57 where this tile is cleared in the colour and/or depth buffer (within the tile/frame buffer) and the tile is marked as clear in the tile clear bitmap. The flow then proceeds with the remainder of the normal graphics processing of this tile via step 53. It should be noted that when the YES path from step 56 has been taken that the ordering of steps 53 and 57 may well in a sense be inverted in that (various or indeed almost all) normal graphics processing of this tile may in fact take place before the tile is cleared and marked as clear in the tile clear bitmap as shown in step 57.

Returning to step 55 if the tile clear bitmap indicates that this tile has previously been cleared, then the flow proceeds to step 58 where further processing for this tile is not carried out, since it is recognised that the tile has both been previously cleared and is empty and hence no update for this tile will be required. The flow then proceed to step 59, where it is determined if there is another tile to be handled by the graphics processing unit for this frame. If there is then this next tile is issued to the fragment frontend at step 51. Once all tiles in this frame are completed then the flow continues from step 59 to step 50 for the next draw call issued by the CPU to the GPU to be received.

Figure 4:
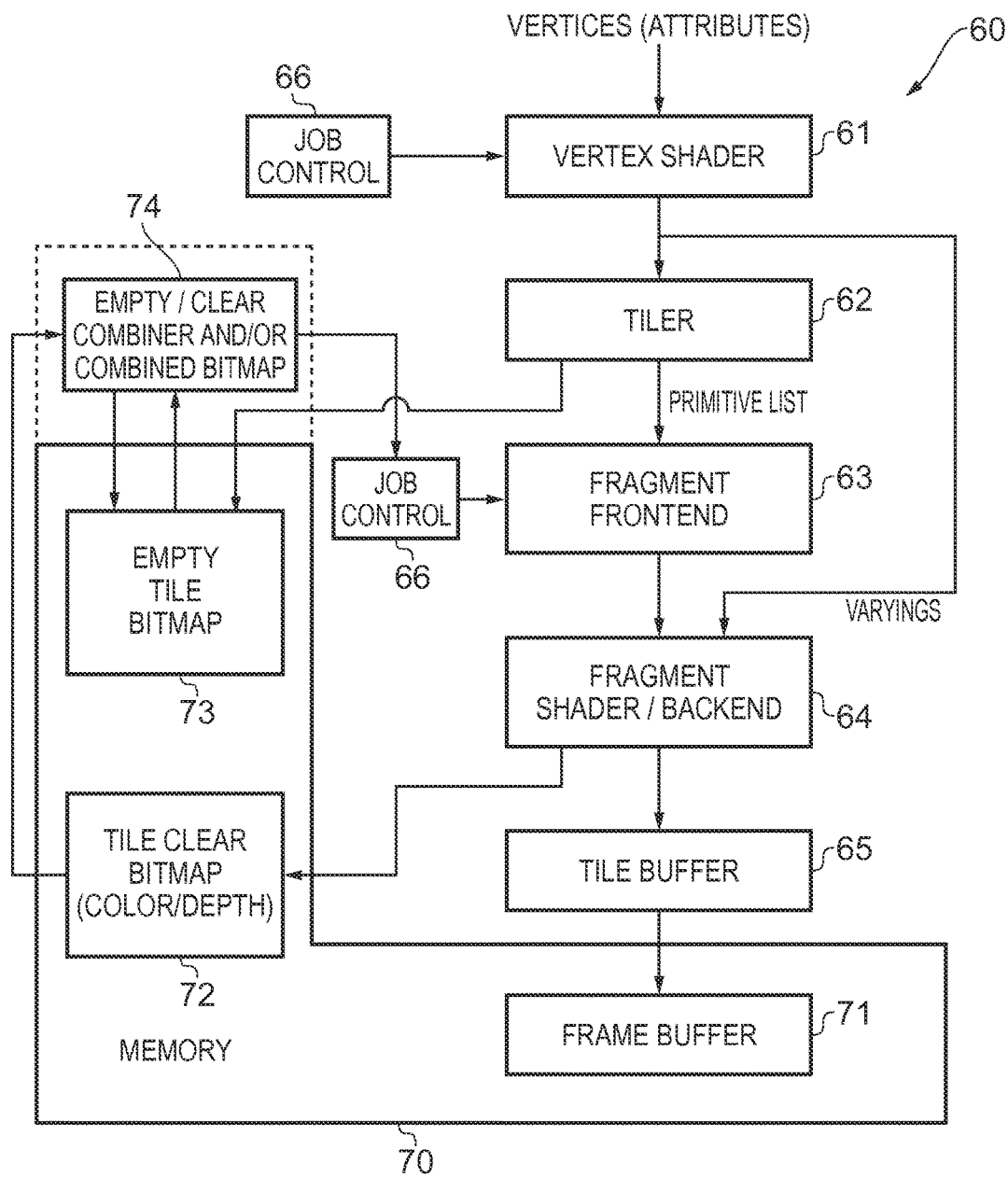
FIG. 4 schematically illustrates a graphics processing apparatus and associated memory in one embodiment.

FIG. 4 schematically illustrates a graphics processing apparatus and associated memory in one embodiment. This graphics processing apparatus 60 has a similar pipelined sequence of processing stages to the graphics processing apparatus shown in FIG. 2A, and only a simplified version of those processing stages is represented in FIG. 4—merely for clarity of illustration. More detail is given here with respect to FIG. 4 for those components of the graphics processing apparatus which differ from the configuration shown in FIG. 2A. As represented here, the sequence of processing stages is represented by the vertex shader 61, the tiler 62, the fragment frontend 63, the fragment shader/backend 64 and the tile buffer 65. The job control 66 also forms part of the graphics processing apparatus.

The graphics processing apparatus 60 is configured to access a memory 70 in which a frame buffer 71 and a tile clear bitmap 72 are stored. In addition, the graphics processing apparatus 60 is configured to store an empty tile bitmap 73 in the memory 70. This empty tile bitmap 73 is arranged to store an indication (a single bit in this embodiment) indicating for each tile in a frame whether it is empty or not. The tiler 62 of the graphics processing apparatus 60 is configured to populate this empty tile bitmap 73 for each frame which the graphics processing apparatus processes. Where the tiler 62 is configured to perform its operations to subdivide the frame into multiple tiles and determine a primitive list for each of those tiles before the first the is passed to the fragment frontend 63, the empty tile bitmap 73 can thus be fully populated in advance of the operation of the remainder of the processing stages of the graphics processing apparatus.

The information stored in the empty tile bitmap 73 is made use of by combination with the information stored in the tile clear bitmap 72. For each tile which the graphics processing apparatus handles, the information can thus be combined as to whether this tile has already been set as clear (in at least the previous frame) as indicated by the content of the tile clear bitmap 72 and if the current tile in the current frame has been determined to be empty by the tiler 62 (as indicated in the empty tile bitmap 73). The combination of the information from the bitmaps 72 and 73 may be performed by a "empty/clear combiner" 74 in the graphics processing apparatus, which may be configured to generate a single indication of whether both the relevant tile clear bitmap indication and empty tile bitmap indication are set for the current tile and pass this information directly to the job control 66.

The empty/clear combiner 74 may however further be configured to generate a combined bitmap for each frame, this combined bitmap indicating those tiles within the frame which have previously been marked as clear and are currently empty. The dashed line showing a possible extension of memory 70 indicates that this combined empty/clear bitmap may be stored in memory 70. When the tile clear bitmap 72, empty tile bitmap 73 and combined empty/clear bitmap 74 are stored in memory 70, an advantage of doing so is that the tiler 62 and job control 66 of the graphics processing apparatus 60 which access this information can do so via memory accesses which write and read blocks of the bitmaps together, to amortize the cost of the required memory transactions. In configurations in which the bitmaps are stored locally in the graphics processing apparatus, such block-wise access to the bitmaps may be of lesser importance. However the empty tile bitmap and the tile clear bitmap are stored, and the content therein combined, this information is passed to the job control 66 which is arranged to prevent further processing of those tiles which are identified as currently empty and having been previously cleared. In particular, in the illustrated embodiment the job control 66 does not issue tasks (jobs) related to such tiles to the fragment frontend 63.

Figure 5:
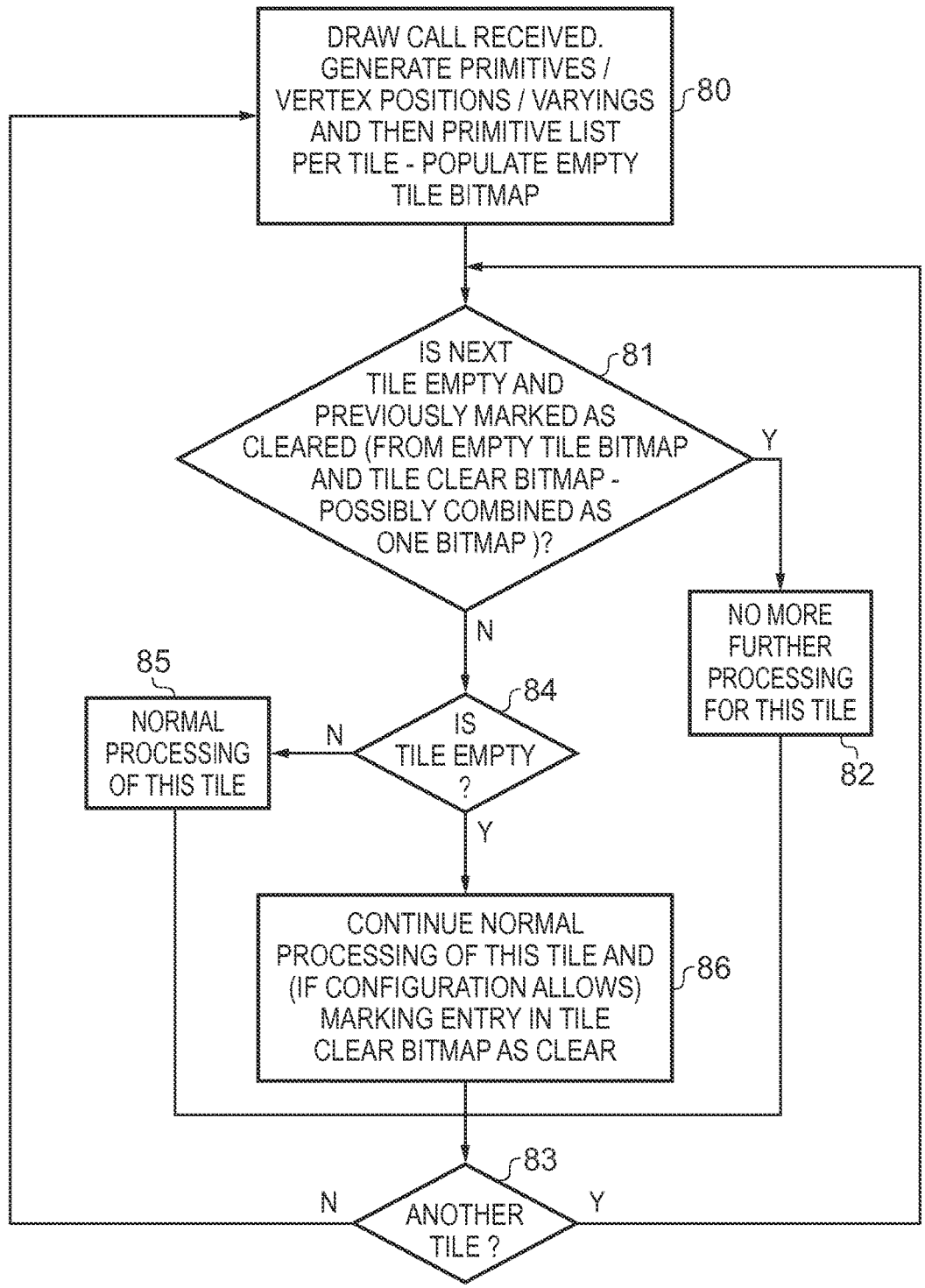
FIG. 5 shows a sequence of steps which may be taken by a graphics processing apparatus such as that illustrated in FIG. 4 in one embodiment.

FIG. 5 schematically illustrates a sequence of steps which may be taken by the method of one embodiment in a graphics processing apparatus such as that illustrated in FIG. 4. The flow of the steps shown in FIG. 5 can be considered to begin at step 80 where the graphics processing apparatus receives a draw call from the CPU. It then generates the primitives, vertex positions, and varyings from this draw call, and thereafter generates a primitive list per tile. From the primitive list per tile, the empty tile bitmap for this frame is then populated, indicating which of those tiles is determined from its primitive list to be empty. Next, each tile is considered in turn for further processing and at step 81 it is determined if the next tile is empty and this tile has been previously marked as cleared (i.e. in the tile clear bitmap). As mentioned above, this could be determined from a combination of the individual bits for this tile as required, or could be done via the retrieval of the relevant entry from a combined empty/clear bitmap. If this tile is determined to be currently empty and previously marked as cleared, then the flow proceeds via step 82, no further processing for this tile being required, and thereafter at step 83 it is determined if there is another tile within this frame to be processed. Whilst further tiles require consideration, the flow loops back to step 81. If at step 81 it is determined that the condition is not true, then the flow proceeds to step 84 from where one of two possible paths can be taken depending on whether this tile is empty or not. If the tile is not empty then the flow proceeds via step 85 where normal processing of this tile is carried out through the sequence of processing stages in the graphics processing apparatus. If however, the tile is empty, then flow proceeds via step 86 where normal processing of this tile is also continued, but (if the relevant colour and/or depth write configuration is enabled for this tile) it is marked in the tile clear bitmap as being clear. The flow then proceeds to step 83. Once it is determined at step 83 that there are no further tiles within this frame to be considered for processing, then the flow returns to step 80.

Figure 6:
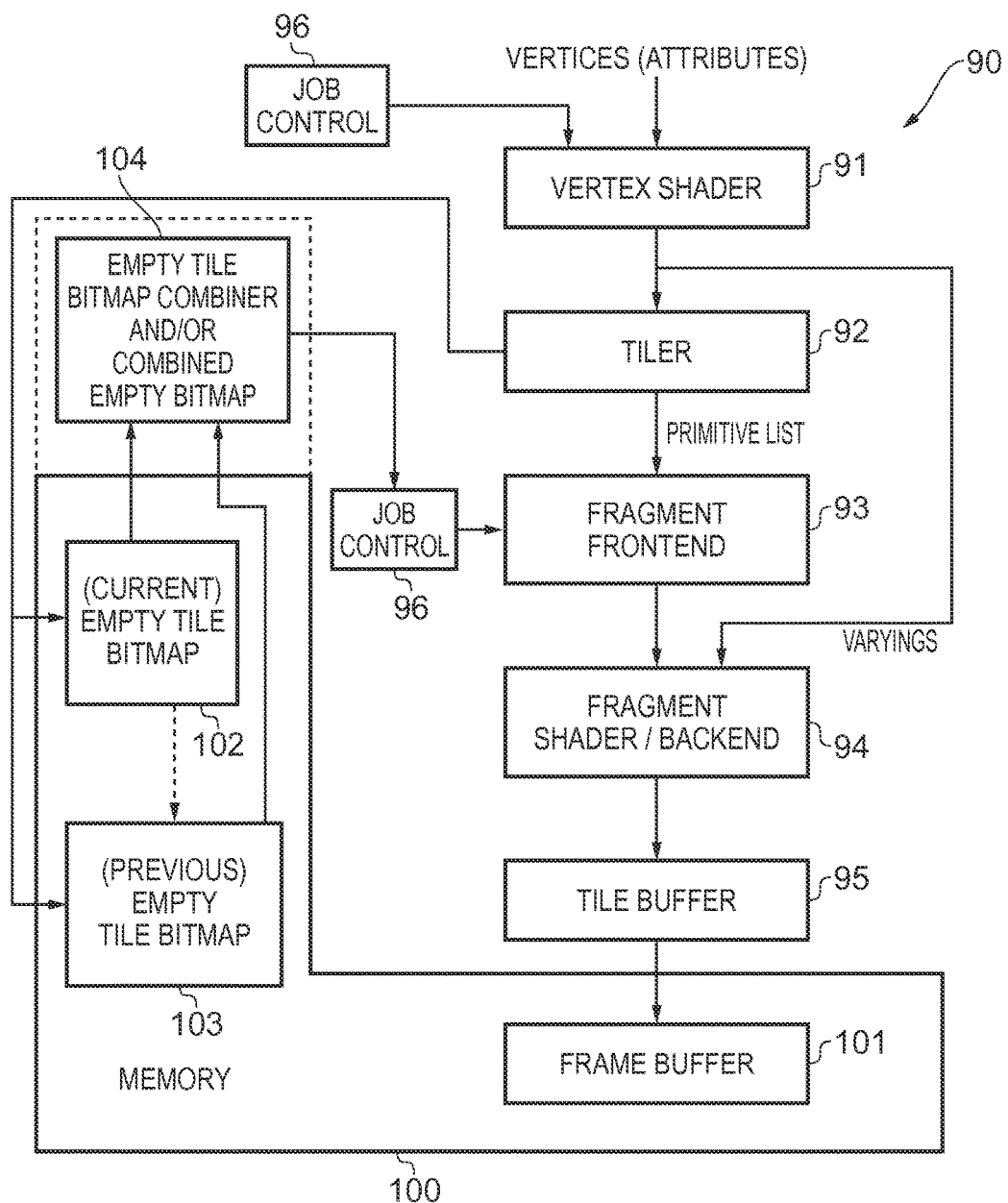
FIG. 6 schematically illustrates a graphics processing apparatus and associated memory in one embodiment.

FIG. 6 schematically illustrates a further example embodiment of a graphics processing apparatus. This graphics processing apparatus 90 comprises a similar set of processing stages to those represented for the graphics processing apparatus 60 in FIG. 4 and are represented here by the vertex shader 91, the tiler 92, the fragment frontend 93, the fragment shader backend 94 and the tile buffer 95. The graphics processing apparatus 90 further has job control 96 which controls various aspects of the processing it performs, in particular determining the operation of the vertex shader 91, and determining which tiles are issued to the fragment frontend 93. The graphics processing apparatus 90 accesses a memory 100 in which the frame buffer 101 is stored and into which processed graphics data for display is stored on a tile by tile basis. Additionally, the memory 100 also stores two empty tile bitmaps, a "current" empty tile bitmap 102 and a "previous" empty tile bitmap 103. Each of these is populated by information generation by the tiler 92, which populates the current empty tile bitmap 102 in the same manner in which the tiler 62 populates the empty tile bitmap 73 as described above with reference to FIG. 4. Moreover, the previous empty tile bitmap 103 stores the same information as the current empty tile bitmap, but for the previous frame, can be populated simply by re-labelling the current empty tile bitmap once the processing of a frame has concluded. A transfer of content from the current empty tile bitmap 102 to the previous empty tile bitmap 106 is therefore not necessary, but is also contemplated (indicated by the dashed arrow between bitmap 102 and bitmap 103).

The information stored in the current empty tile bitmap 102 and the previous empty tile bitmap 103 is combined to provide an indication of whether, for a given tile, it is both empty in the current frame and was also empty in the previous frame. As described above for the embodiment shown in FIG. 4 (where information from the empty tile bitmap 73 and tile clear bitmap 72 is combined), in a similar manner in the embodiment shown in FIG. 6 the combination of information from the bitmaps 102 and 103 may be performed by the empty tile bitmap combiner 104 as an individual action for each tile, or as part of the generation of a combined empty bitmap representing, for each tile in the frame, whether the relevant bit in both bitmaps 102 and 103 is set. However this information from the two empty tile bitmaps is combined, it is made use of by the job control 96 to determine if further processing of the current tile is required. The job control 96 further makes reference to the colour/depth write enable status for this tile (which as mentioned above may be set individually for the tile, or more generally for the frame etc.). If colour/depth write is enabled and both consecutive tile empty tile bitmaps indicate that the relevant tile is/was empty, then it can be concluded that the tile has already been cleared and doesn't need to be processed further. Accordingly, in this situation the job control 96 causes this tile not to be issued to the fragment frontend 93 for further processing and the next tile can then be considered.

Figure 7:
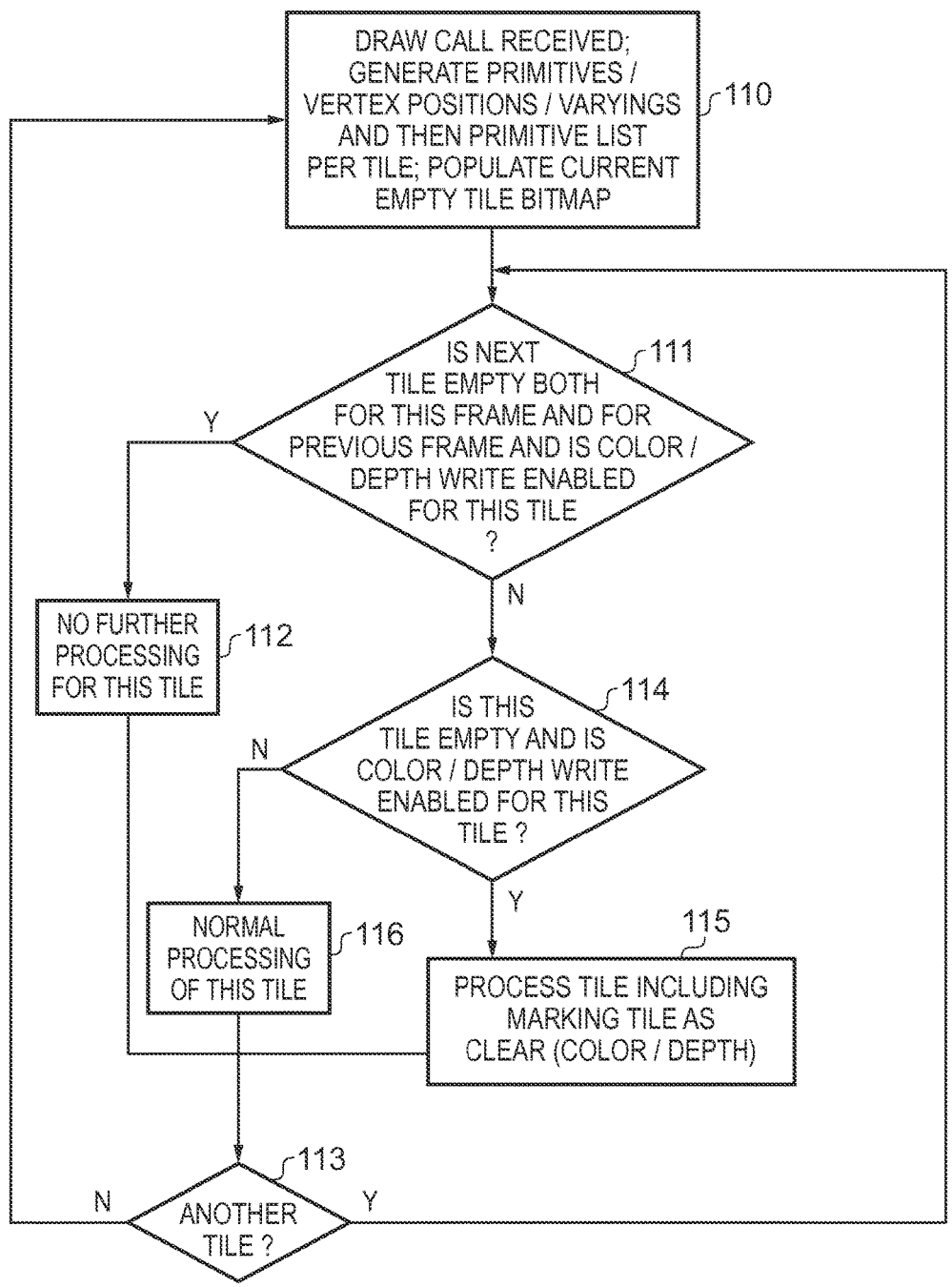
FIG. 7 shows a sequence of steps which may be taken by a graphics processing apparatus such as that illustrated in FIG. 6 in one embodiment.

FIG. 7 schematically illustrates a sequence of steps which may be taken according to the method of one embodiment by a graphics processing apparatus such as that illustrated in FIG. 6. The flow can be considered to begin at step 110 where a draw call is received by the graphics processing apparatus from the CPU, on the basis which it generates the primitives, vertex positions, and varyings, and then a primitive list per tile. For each tile processed, it is determined if this tile is empty (from its primitive list) and the current empty tile bitmap is populated. Once this first stage of processing by the tiler has completed, the flow continues to step 111 where it is determined if the tile under consideration is empty both for this frame and for the previous frame (as indicated by the content of the current empty tile bitmap and the previous empty tile bitmap) and if colour/depth write is enabled for this tile. If this is true, then the flow proceeds to step 112 and no further processing for this tile is required. The flow then continues via step 113 where it is determined if there is another tile in this frame for consideration for issuance to the fragment frontend (under administration of the job control 96) for further processing. Whilst there are further tiles in this frame, the flow loops back to step 111. If the condition at step 111 is not true then the flow proceeds to step 114, where it is determined if this tile is currently empty and colour/depth write is enabled for this tile. If this is true then the flow proceeds via step 115 where normal processing of the tile continues, which will include marking the tile as clear for colour/depth as appropriate. If however at step 114 this condition is not true, then the flow proceeds via step 116 where normal processing of this tile (without marking it as clear) takes place. Once, at step 113, it is determined that there are no further tiles in this frame for processing, then the flow returns to step 110.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope and spirit of the invention as defined by the appended claims. For example, various combinations of the features of the dependent claims could be made with the features of the independent claims without departing from the scope of the present invention.

The invention claimed is:

1. A method of graphics processing comprising:
performing graphics processing in a sequence of processing stages to generate a frame of display data, wherein the sequence of processing stages is capable of performing the graphics processing on a tile-by-tile basis;
determining if a current tile subject to the graphics processing is empty;
setting a predetermined value of a display parameter for the current tile if it will not contribute to the display of the frame of display data; and
causing at least one processing stage of the sequence of processing stages to be omitted for graphics processing of the current tile in dependence on whether the current tile is empty and the display parameter of a corresponding tile of a previous frame at a same display position as the current tile has the predetermined value.

2. Graphics processing apparatus comprising:
a sequence of processing stages to perform graphics processing to generate a frame of display data,
wherein the sequence of processing stages is capable of performing the graphics processing on a tile-by-tile basis,
and wherein the graphics processing apparatus is capable of determining if a current tile subject to the graphics processing is empty,
and wherein the graphics processing apparatus is capable of causing at least one processing stage of the sequence of processing stages to be omitted for graphics processing of the current tile in dependence on whether the current tile is empty,
and wherein the frame of display data comprises a display parameter for each tile in the frame, and the graphics processing apparatus is capable of setting a predetermined value of the display parameter for the current tile if it will not contribute to the display of the frame of display data, and wherein the graphics processing apparatus is capable of causing the at least one processing stage of the sequence of processing stages to be omitted for graphics processing of the current tile if the current tile is empty and the display parameter of a corresponding tile of a previous frame at a same display position as the current tile has the predetermined value.

3. The graphics processing apparatus as claimed in claim 2, wherein the graphics processing apparatus is capable of causing the at least one processing stage of the sequence of processing stages to be carried out for graphics processing of the current tile if the current tile is empty and the display parameter of a corresponding tile of the previous frame at the same display position as the current tile does not have the predetermined value.

4. The graphics processing apparatus as claimed in claim 2, wherein the display parameter comprises at least one of:
a color value; and
a depth value.

5. The graphics processing apparatus as claimed in claim 2, wherein the graphics processing apparatus is capable of maintaining a clearance indication for each tile of the multiple tiles and to cause the clearance indication to be set for tiles determined to have the predetermined value of the display parameter.

6. The graphics processing apparatus as claimed in claim 5, further comprising a clearance buffer capable of storing the clearance indication as a clearance bitmap.

7. The graphics processing apparatus as claimed in claim 5, wherein the graphics processing apparatus comprises a data buffer capable of storing information related to the frame of display data, wherein the graphics processing apparatus is capable of storing the clearance indication as additional content of the data buffer.

8. The graphics processing apparatus as claimed in claim 2, wherein the graphics processing apparatus is capable of accessing a frame buffer which is updated to hold the frame of display data by a frame buffer updating stage of the sequence of processing stages, and the frame buffer updating stage is capable of updating the frame buffer for the current tile in dependence on a comparison between a checksum value for the current tile and a stored checksum value for the corresponding tile of the previous frame at the same display position, and the graphics processing apparatus is capable of determining if the current tile has the predetermined value in dependence on the checksum value for the current tile.

9. The graphics processing apparatus as claimed in claim 2, wherein the graphics processing apparatus is capable of accessing a frame buffer which is updated to hold the frame of display data by a frame buffer updating stage of the sequence of processing stages, and the graphics processing apparatus is capable of causing the frame buffer updating stage of the sequence of processing stages to be omitted for graphics processing of the current tile in dependence on whether the current tile is empty.

10. The graphics processing apparatus as claimed in claim 2, wherein the graphics processing apparatus comprises a tile buffer in which display data for the current tile is stored by a tile buffer updating stage of the sequence of processing stages, and the graphics processing apparatus is capable of causing the tile buffer updating stage of the sequence of processing stages to be omitted for graphics processing of the current tile in dependence on whether the current tile is empty.

11. The graphics processing apparatus as claimed in claim 2, wherein the sequence of processing stages comprises a tiling stage capable of subdividing the frame into the multiple tiles and to issue the current tile to a subsequent processing stage, and the graphics processing apparatus is capable of causing the tiling stage not to issue the current tile to the subsequent processing stage when the current tile is empty.

12. The graphics processing apparatus as claimed in claim 2, wherein the graphics processing performed by the sequence of processing stages comprises generating a primitive list for the current tile, wherein the primitive list is indicative of graphical components of the geometrical object, and the graphics processing apparatus is capable of determining if the current tile is empty from the primitive list.

13. Graphics processing apparatus comprising:
a sequence of processing stages to perform graphics processing to generate a frame of display data,
wherein the sequence of processing stages is capable of performing the graphics processing on a tile-by-tile basis,
and wherein the graphics processing apparatus is capable of determining if a current tile subject to the graphics processing is empty,
and wherein the graphics processing apparatus is capable of causing at least one processing stage of the sequence of processing stages to be omitted for graphics processing of the current tile in dependence on whether the current tile is empty,
and wherein the graphics processing apparatus is capable of maintaining an emptiness indication for each tile of the multiple tiles and to cause the emptiness indication to be set for a tile determined to be empty,
and wherein the graphics processing apparatus is capable of maintaining a clearance indication for each tile of the multiple tiles and to cause the clearance indication to be set for tiles determined to have the predetermined value of the display parameter, wherein the graphics processing apparatus is capable of causing the at least one processing stage of the sequence of processing stages to be omitted for graphics processing of the current tile if the current tile is empty and the clearance indication has been set for the corresponding tile of the previous frame at the same display position as the current tile.

14. The graphics processing apparatus as claimed in claim 13, further comprising an emptiness buffer capable of storing the emptiness indication as part of an emptiness bitmap.

15. Graphics processing apparatus comprising:
a sequence of processing stages to perform graphics processing to generate a frame of display data,
wherein the sequence of processing stages is capable of performing the graphics processing on a tile-by-tile basis,
and wherein the graphics processing apparatus is capable of determining if a current tile subject to the graphics processing is empty,
and wherein the graphics processing apparatus is capable of causing at least one processing stage of the sequence of processing stages to be omitted for graphics processing of the current tile in dependence on whether the current tile is empty,
and wherein the graphics processing apparatus is capable of maintaining an emptiness indication for each tile of the multiple tiles and to cause the emptiness indication to be set for a tile determined to be empty,
and wherein the frame of display data comprises a display parameter for each tile in the frame, and the graphics processing apparatus is capable of setting a predetermined value of the display parameter for a tile which will not contribute to the display of the frame of display data if a display parameter write configuration has been enabled for that tile, and wherein the graphics processing apparatus is capable of causing the at least one processing stage of the sequence of processing stages to be omitted for graphics processing of the current tile if the current tile is empty and the emptiness indication has been set for the corresponding tile of the previous frame at the same display position as the current tile and the display parameter write configuration is enabled.

16. The graphics processing apparatus as claimed in claim 15, wherein the graphics processing apparatus further comprises storage capable of storing an emptiness indication for the current tile.

17. The graphics processing apparatus as claimed in claim 16, wherein the storage capable of storing the emptiness indication for the current tile is capable of storing a current emptiness bitmap for at least a portion of a current frame to which the current tile belongs.

18. The graphics processing apparatus as claimed in claim 15, wherein the graphics processing apparatus is configured to preload emptiness indications for multiple tiles from the storage capable of storing the emptiness indication for the current tile.

* * * * *